United States Patent
Kavanagh et al.

(10) Patent No.: US 8,189,567 B2
(45) Date of Patent: May 29, 2012

(54) METHOD AND NODES FOR REGISTERING A TERMINAL

(75) Inventors: Alan Kavanagh, Montreal (CA); Suresh Krishnan, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 400 days.

(21) Appl. No.: 12/482,981

(22) Filed: Jun. 11, 2009

(65) Prior Publication Data

US 2010/0189052 A1    Jul. 29, 2010

Related U.S. Application Data

(60) Provisional application No. 61/148,094, filed on Jan. 29, 2009.

(51) Int. Cl.
*H04L 12/66* (2006.01)
(52) U.S. Cl. ........................................ 370/352
(58) Field of Classification Search .................... 370/352
See application file for complete search history.

(56) References Cited

U.S. PATENT DOCUMENTS

| | | | |
|---|---|---|---|
| 2003/0154243 A1* | 8/2003 | Crockett et al. | 709/203 |
| 2004/0029584 A1* | 2/2004 | Le et al. | 455/432.1 |
| 2004/0157607 A1* | 8/2004 | Kim et al. | 455/435.2 |
| 2008/0076419 A1* | 3/2008 | Khetawat et al. | 455/435.1 |
| 2008/0122621 A1 | 5/2008 | Archer et al. | |
| 2009/0109963 A1* | 4/2009 | Tanizawa et al. | 370/352 |
| 2009/0191873 A1* | 7/2009 | Siegel et al. | 455/435.2 |
| 2010/0008352 A1* | 1/2010 | Przybysz et al. | 370/352 |
| 2010/0269155 A1* | 10/2010 | Droms et al. | 726/3 |

OTHER PUBLICATIONS

Taaghol P. et al.: "Seamless Integration of Mobile WiMax in 3GPP Networks", IEEE Communications Magzaine; IEEE Service Center, Piscataway, US, LNKDDOI.1109/MCOM.2008.4644122, vol. 46, No. 10, Oct. 1, 2008, pp. 74-85; XP011236262.
3GPP TS 29.273, V8.0.0: "3rd. Generation Partnership Project; Technical Specification Group Core Network and Terminals; Evolved Packet System (EPS); 3GPP EPS AAA Interfaces", Release 8; Mobile Competence Center, Cedex,France; Dec. 1, 2008, 77 pages; XP050372740.
Gundavelli S. et al.: "Proxy Mobile IPv6; rfc5213.txt"; Internet Engineering Task Force; Geneva, Switzerland; Aug. 1, 2008, 92 pages, XP015060252.
Korhonen J. et al.: "Diameter Proxy Mobile IPv6: Support for Mobile Access Gateway and Local Mobility Anchor to Diameter Server Interaction; draft-ietf-dime-pmip6-00.txt"; Internet Engineering Task Force; Jan. 14, 2009, 21 pages, XP015060822.
Rekhter Y. et al.: RFC 2073, "An IPv6 Provider-Based Unicast Address Format", 7 pages, Jan. 1997.
Droms, R. et al.: RFC 3315, "Dynamic Host Configuration Protocol for IPv6 (DHCPv6)", 101 pages, Jul. 2003.

(Continued)

*Primary Examiner* — Chi Pham
*Assistant Examiner* — Fan Ng
(74) *Attorney, Agent, or Firm* — Ericsson Canada Inc.

(57) ABSTRACT

A method and nodes are provided for registering a terminal. The terminal is capable of connecting in two distinct networks. The registration process for the terminal maps an identity and traffic handling policies of the terminal in a first network with an address prefix of the terminal obtained from the second network. The address prefix is obtained from the second network following authorization of the terminal in the first network. As traffic is exchanged between the terminal and a correspondent node while the terminal is accessing the second network, the mapping is used to ensure that policies for the terminal in the first network are applied in the second network.

16 Claims, 5 Drawing Sheets

OTHER PUBLICATIONS

Troan & Droms: RFC 3633, "IPv6 Prefix Options for Dynamic Host Configuration Protocol (DHCP) version 6", 19 pages, Dec. 2003.

Xinbing Wang & Wenye Wang: "An Efficient Negotiation Protocol for Real-Time Multimedia Applications Over Wireless Networks", IEEE Communications Society, (pp. 2533-2538), 2004.

Kwon, Hyeyeon et al.: "UMTS-WLAN Interworking Strategies for Reducing Handover Delays", 5 pages, 2006.

KR 2003004947, abstract: "Method for Identifying Interfaces Using Mobile Station Identification in Internet Protocol version 6", Jan. 27, 2009.

* cited by examiner

METHOD AND NODES FOR REGISTERING A TERMINAL

PRIORITY STATEMENT UNDER 35 U.S.C. S.119(e) & 37 C.F.R. S.1.78

This non-provisional patent application claims priority based upon the prior U.S. provisional patent application entitled "Identification of Clients Behind Layer 3 Residential Gateways", application No. 61/148,094, filed Jan. 29, 2009, in the names of Alan Kavanagh and Suresh Krishnan.

TECHNICAL FIELD

The present invention relates generally to the field of communications and, more specifically, to a method and nodes for registering a terminal.

BACKGROUND

Broadband access networks use cable, digital subscriber lines (DSL), WiMAX, and like technologies, to provide high quality, high bandwidth services to end-users in their homes. The Broadband Forum (http://www.broadband-forum.org/) defines standards for connecting clients to fixed broadband access networks. FIG. 1 (prior art) represents a typical home network and nodes providing access thereto. A home network 100 uses a layer 3 Residential Gateway (RG) 110 to connect user devices to a fixed access operator. Behind the RG 110, a subscriber may connect multiple devices 120a, 120b, 120c, which can be personal computers (PC), laptops, television Set Top Boxes, IP Phones, mobile User Equipment (UE), and the like. The RG 110 connects to an access node 130; the access node 130 may support various access technologies such as DSL, cable, or WiMAX. The access node 130 provides a link between the RG 110 and a first node within a fixed access network, which may be for example an IP edge node 140. The fixed access network is a broadband network owned and operated by a service provider. When the RG 110 connects to the fixed access network, a dynamic host configuration protocol (DHCP) server 150 of the fixed access network hands over a block of internet protocol version 6 (IPv6) address space to the RG 110. The address space may for example be a subscriber identity (ID), also called a "/56 prefix", as defined in the Request for Comments (RFC) 2073 from the Internet Engineering Task Force (IETF). The RG 110 then splits the /56 prefix into smaller pieces. In turn, according to the same RFC, the RG 110 may allocate, from the /56 prefix, an Intra-Subscriber part, also called "/64 prefix", to each device 120a, 120b, 120c, in the residential network 100.

Since the RG 110 is a router, it hides the home network 100 and locally connected devices 120a, 120b, 120c. An operator of the fixed access network cannot identify the customer devices 120a, 120b, 120c, behind the RG 110. Otherwise stated, an IPv6 address that a given subscriber device 120a, 120b, 120c, is assigned behind the RG 110 is not visible to the fixed access network.

One of the devices 120a, 120b, 120c may be a 3$^{rd}$ Generation Partnership Project (3GPP) based dual-mode mobile terminal, or dual-mode UE, supporting for example a Wireless Local Area Network (WLAN) access technology along with a 3GPP High Speed Packet Access (HSPA) access technology or a 3GPP Long Term Evolution (LTE) access technology. A 3GPP network assigns an IP address for exchange of traffic between the UE and any correspondent node. This IP address is a Mobile Internet Protocol home address for the UE. When the dual-mode UE is connected to the fixed access network, that network allocates another IP address (or a range of IP addresses defined by an address prefix) to the UE. This other IP address is a Mobile Internet Protocol care-of address for the UE. A well-known binding process for these two addresses ensures that data intended for delivery to the UE, directed to its 3GPP-assigned home address, is properly routed to the care-of address while the UE is active in the fixed access network.

The dual-mode terminal is an excellent support for fixed-mobile convergence, a concept aimed at providing seamless connectivity between fixed and wireless communications networks. A 3GPP operator and the operator of the fixed access network may agree to provide similar levels of service to a given user, according to policies of the 3GPP network, defined according to the user's subscription level, and provided to the fixed access network. With fixed-mobile convergence, the dual-mode terminal user should, in principle, have access to the same type of services as he/she connects to a 3GPP network or to the fixed access network. However, when the dual-mode terminal is connected to the fixed access network, the fixed access network operator cannot offer the services the terminal has subscribed to in the 3GPP network because no 3GPP identity of the dual-mode terminal is visible beyond the RG 110. The broadband network has no means to identify the dual-mode terminal as a 3GPP terminal having a predefined service level contract. This is an impediment to fixed-mobile convergence. The operator cannot give preferential treatment to the terminal, even though such treatment might bring additional revenues. In addition, this rules out delivery of personalized contents to the terminal, such as for example directed advertisements, device specific encodings, and the like, that might be beneficial to the operator.

SUMMARY

There would be clear advantages of having a method and nodes for registering a terminal in such a manner that the terminal can benefit from policies defined therefor in a first network while the terminal is active in a second network. It is a broad object of this invention to provide a method and nodes for registering the terminal.

A first aspect of the present invention is directed to a method of registering a terminal. The method comprises a first step of receiving at an edge node an identity and credentials of the terminal as well as a local identifier. The credentials and the local identifier are sent from the edge node in a request for authorization for the terminal. Thereafter, an authorization is received for the terminal. An address request comprising the local identifier is then sent by the edge node for the terminal and, consequently, an address is received at the edge node for the terminal. The edge node stores a mapping of the received address with the identity of the terminal by use of the local identifier.

A second aspect of the present invention is directed to an embodiment of the above method in which the edge node further receives policies related to the identity of the terminal. The edge node adds the received policies to the mapping. As traffic is exchanged between the terminal and a correspondent node, the traffic being transiting through the edge node, the edge node applies the policies to the traffic.

A third aspect of the present invention is directed to an edge node for registering a terminal. The edge node comprises an interface configured to communicate with a residential gateway, with an authentication server and with an address server. The edge node also comprises a controller. The controller controls the interface. The controller is further configured to receive from the residential gateway an identity, credentials and a local identifier of the terminal, send towards the authentication server the credentials and the local identifier in a request for authorization for the terminal, receive from the authentication server an authorization for the terminal, send towards the address server an address request comprising the local identifier for the terminal, receive from the address server an address for the terminal, and map the received address with the identity of the terminal by use of the local identifier.

A fourth aspect of the present invention is directed to a residential gateway for registering a terminal. The residential gateway comprises an interface configured to communicate with the terminal and with an edge node. The residential gateway also comprises a controller to control the interface. The controller is further configured to receive from the terminal an identity and credentials of the terminal, assign a local identifier to the terminal, send towards the edge node the credentials, the identity and the local identifier in a request for authorization for the terminal, receive from the edge node an authorization for the terminal, send towards the edge node an address request comprising the local identifier for the terminal, receive from the edge node an address for the terminal, and map the received address with the identity of the terminal by use of the local identifier.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION

Figure 1:
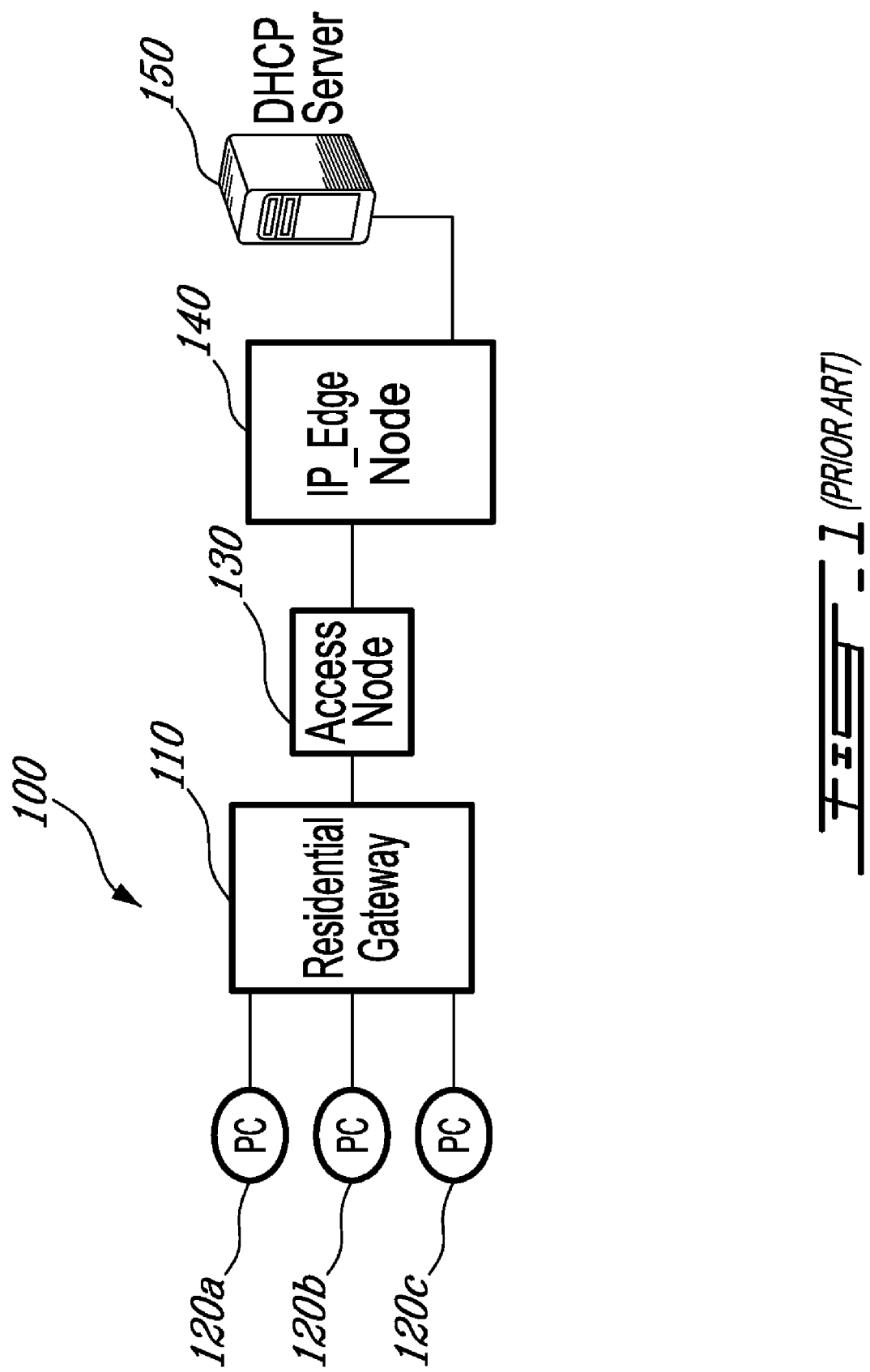
FIG. 1 is a prior art representation of a typical home network and nodes providing access thereto.

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

The present invention provides a method and nodes for registering a terminal. The terminal may receive service from more than one network, one of which being for example a fixed broadband network and the other one being for example a mobile cellular network. The terminal may be a dual-mode terminal, capable of accessing two networks by use of distinct access technologies. Generally, the terminal may connect to a residential gateway, located at an end user's premises. Several distinct devices may connect to the same residential gateway and one or more of these may benefit from the teachings of the present invention. The residential gateway connects to the broadband network. The broadband network allocates to the residential gateway a range of Internet Protocol (IP) addresses, for example IP version 6 (IPv6) addresses. In turn, the residential gateway allocates, from that range of IP addresses, one address or a smaller range of addresses to each connected devices. If the terminal is capable of connecting to a mobile cellular network, such as a $3^{rd}$ generation partnership project (3GPP) network, the terminal may not be visible to the 3GPP network while connected through the residential gateway to the broadband network. According to the present invention, the 3GPP-capable terminal registers to the residential gateway, supplying its identity and other credentials according to 3GPP protocols. The residential gateway allocates to the terminal a local identifier, which is unique within the residential gateway. The residential gateway then sends the 3GPP identity, local identifier and credentials, as parts of an authorization request, to a node of the broadband network. The broadband network node stores the local identifier and forwards the authorization request to the 3GPP network. The requested authorization is received at the broadband network node and forwarded to the residential gateway. The residential gateway then sends an IP address request carrying the local identifier to the broadband network node. The broadband network node forwards the received request to an address server. Upon receiving a response, which also carries the local identifier, the broadband network node uses the local identifier to associate a received IP address, or more generally an IP address prefix, with the earlier stored 3GPP identity. It forwards the response to the residential gateway where the IP address prefix and the 3GPP identity are also mapped. Policies controlling quality of service and resource allocation for the terminal are received at the broadband network node from the 3GPP network. Mapping of the IP address prefix and of the 3GPP identity permits applying in the broadband network the received policies, as if the terminal was present in the 3GPP network.

Although the present description of exemplary embodiments is directed mainly to application of the present invention to 3GPP networks, it should be understood that this is not a limitation. For example, the invention could apply to a terminal having a subscription in a Third Generation Partnership Project 2 (3GPP2) network.

In the context of the present invention, the residential gateway may be any generic device, usually located at the end-user's premises, capable of connecting one or more local end-user devices and terminals to a broadband network. The residential gateway may connect to the devices by use of a wireless local area network (WLAN) technology, by use of cables, e.g. category 5 (CAT5) cables, and the like. The residential gateway may connect to the broadband network by use of coaxial cable, copper twisted pair using digital subscriber line (DSL) technology, WiMAX, and the like. A first node in the broadband network may be an IP edge node, providing local connectivity to a number of residential gateways, for example in a city district. The first node may alternatively be an access edge node, a broadband remote access server, a broadband network gateway, or a similar high-speed gateway node. The terminal may comprise a mobile cellular telephone compliant to the 3GPP standard, to a $3^{rd}$ Generation Partnership Project 2 (3GPP2) standard, also known as CDMA2000 or as one of its variants, a mobile node, a digital personal assistant, a laptop computer, an IP television apparatus, a gaming device, and the like. The terminal supported by the present invention may be a dual-mode terminal. However, a single mode terminal may also benefit from many aspects of the present invention. In some embodiments, a residential gateway may act as a so-called "home base station", providing localized access to devices using a cellular access protocol. As such, a single mode 3GPP or 3GPP2 terminal may act as a cellular device when not located in its end-user's premises, and as an IP-connected device when attached to the residential gateway.

Figure 2:
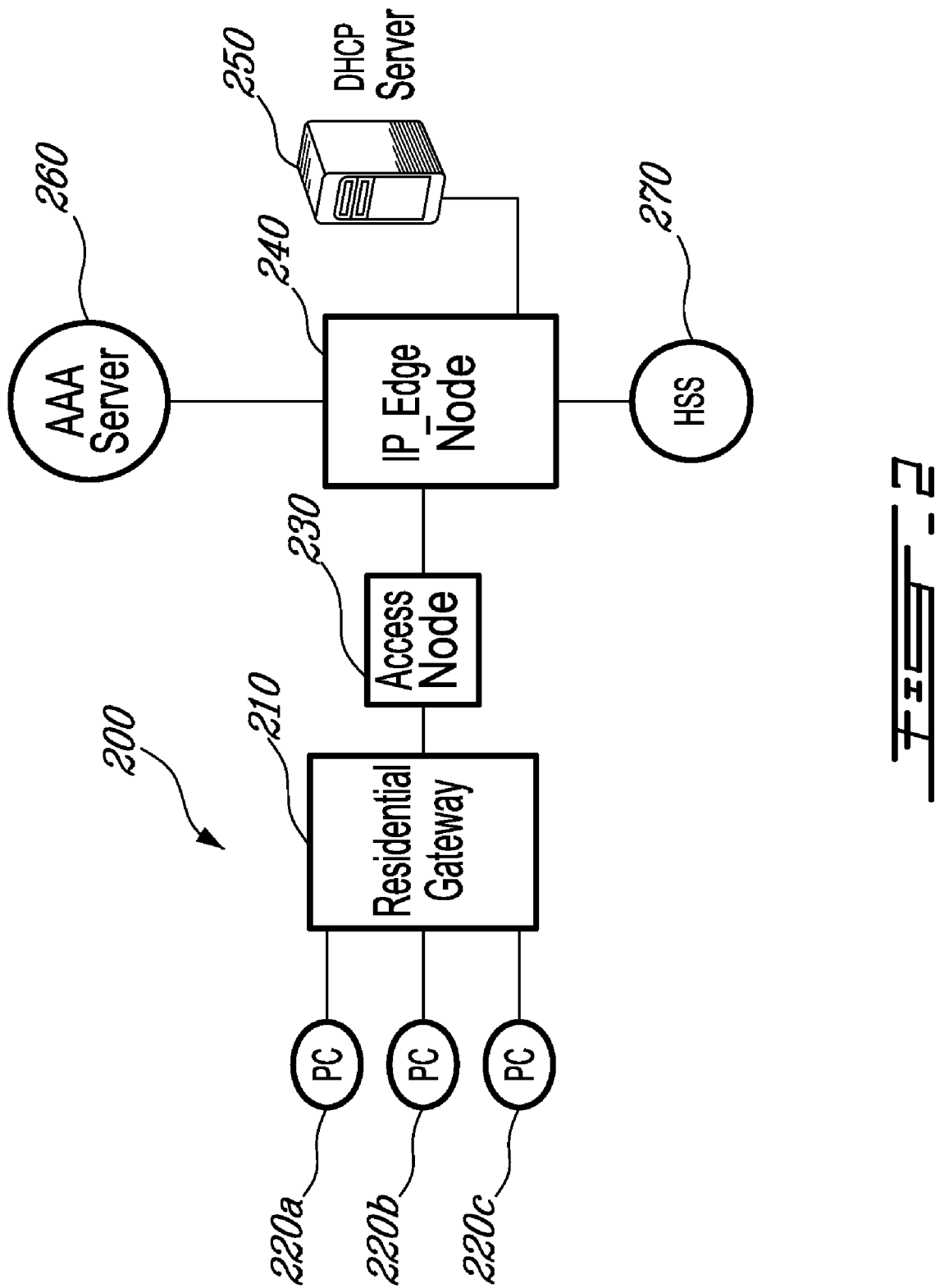
FIG. 2 shows a home network with additional supporting nodes, in support of some teachings of the present invention.

Reference is now made to the Drawings, in which FIG. 2 shows a home network with additional supporting nodes, in support of some teachings of the present invention. The home network 200 comprises a residential gateway (RG) 210 providing access to one or more devices 220a, 220b, 220c, of a user's residential network. Any one or all of the devices 220a, 220b, 220c, may be a 3GPP-capable terminal, including a dual-mode terminal. The RG 210 connects to an access node 230 that provides a link between the RG 210 and a first node within a broadband, fixed access network, which may be for example an IP edge node 240. A dynamic host configuration protocol (DHCP) server 250 provides IP addresses and/or IP address ranges to the RG 210 and to the devices 220a, 220b, 220c. An authentication, authorization and accounting (AAA) server 260 compliant with 3GPP specifications may be used for verification of an identity and other credentials of a 3GPP-capable terminal connected to the RG 210. Alternatively or in addition, this verification may be made at a home subscriber server (HSS) 270. In the context of the present invention, the AAA server 260 and the HSS 270 may be used separately or in combination; the precise manner of obtaining authorization of a 3GPP-capable terminal is outside the scope of the present invention.

Even though elements of the network 200 are shown as directly coupled in FIG. 2, the elements may be indirectly coupled and some of them may be separated geographically. For example, the access node 230 may be transparent for the purposes of the present invention and will no longer be shown in the following illustrations. The simplified coupling of FIG. 2 is shown in order to more clearly illustrate communication paths in the network 200.

Figure 3:
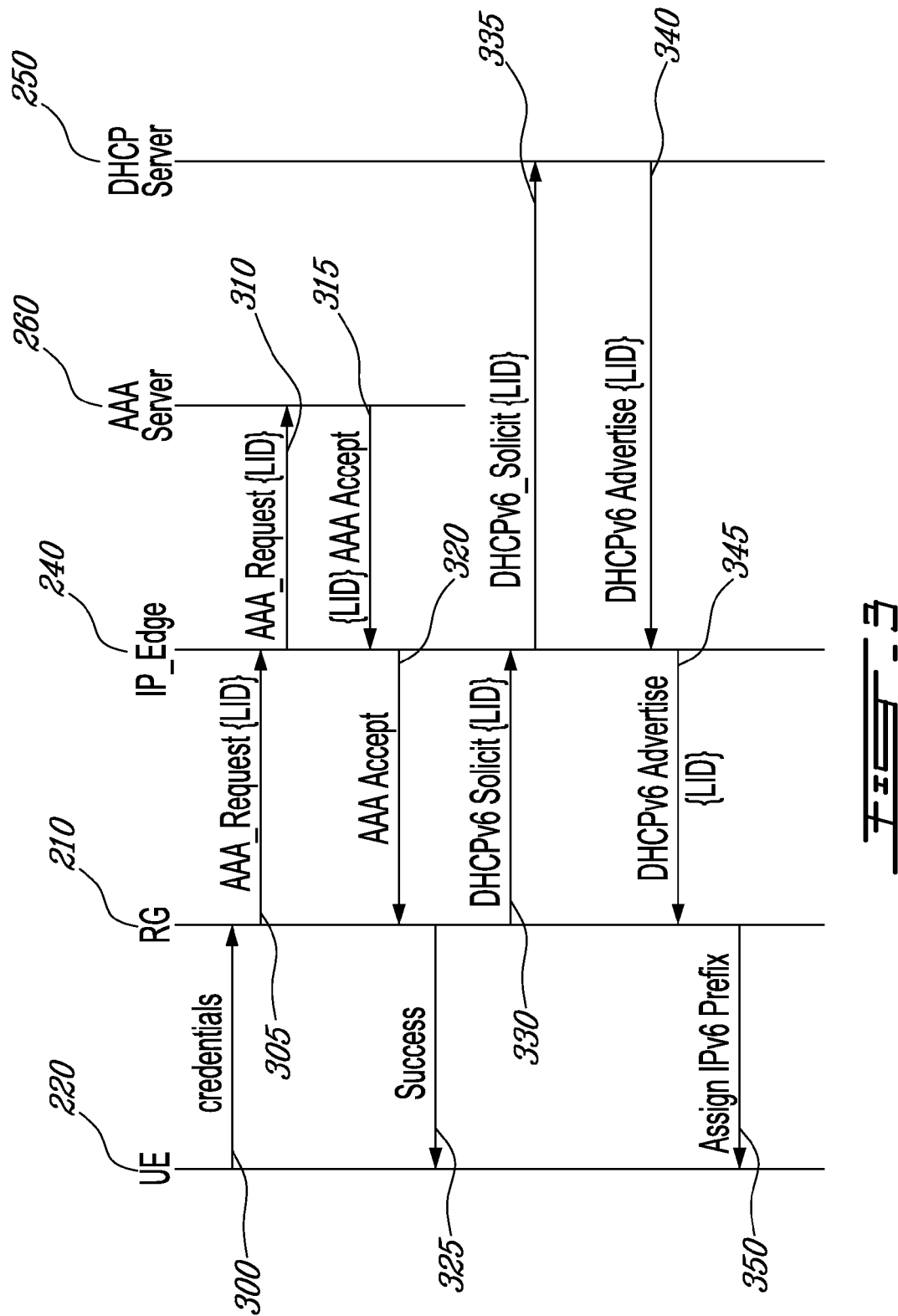
FIG. 3 is an exemplary sequence diagram according to an embodiment of the present invention.

FIG. 3 is an exemplary sequence diagram according to an embodiment of the present invention. The sequence is held between a 3GPP-capable UE 220, the RG 210, the IP edge 240, the MA server 260, and the DHCP 250. These nodes are as introduced in the foregoing description of FIG. 2; the UE 220 being one example of possible devices 220a, 220b, 220c. The features of the AAA server 260 and of the HSS 270 are illustrated as if they are all implemented by the AAA server 260, for simplification of the sequence diagram, but without loss of generality.

At the start of the sequence, the UE 220 is connecting, for example via a WLAN access technology, to the RG 210. The method starts at step 300 when the UE 220 attempts to register by sending its credentials and an identity, for example an International Mobile Station Identity (IMSI) to the RG 210. The credentials may comprise the identity and various other information elements used for authenticating the UE 220 in the 3GPP network, for example Extensible Authentication Protocol-Subscriber Identity Module (EAP-SIM) information elements, or Extensible Authentication Protocol-Authentication and Key Agreement (EAP-AKA) information elements. Upon receiving the IMSI and credentials, the RG 210 allocates a local identifier (LID) to the UE 220. The LID may for example be a monotonously increasing 32-bit value. Other manners of generating the LID may also be used, for example generating a random value by use of any process capable of ensuring its unicity within the range of the RG 210. At step 305, the RG 210 sends a request for authenticating the UE 220, in an AAA request message, to the IP edge 240. The AAA request message comprises the LID. From the standpoint of the IP edge 240, the LID does not need to be globally unique: the IP edge 240 can uniquely recognize a pair comprising the LID and an identity (e.g. an address) of the RG 210. At step 310, the IP edge 240 forwards the AAA request to the AAA server 260 (or to the HSS 270, not shown on FIG. 3). An authorization response, in the form of a AAA accept message, is sent from the AAA server 260 at step 315. The IP edge 240 uses the LID, returned in the AAA accept message, to correlate the response with the request. It then forwards the AAA accept message to the RG 210 in step 320. Likewise, the RG 210 uses the LID to correlate the response with the request. The RG 210 may inform the UE 220 of the successful registration in the 3GPP network at step 325. The sequence continues at step 330 when the RG 210 initiates a process leading the provision of an IPv6 address prefix to the UE 220. The RG 210 sends a DHCPv6 solicit message to the IP edge 240. The solicit message also comprises the LID for correlating a response thereto. In some embodiments, the DHCPv6 solicit message comprises an Identity Association Prefix Delegation (IA_PD) option and sets a 32-bit Identity Association Identifier (IAID) of the IP_PD option to the LID value. The process initiated at step 330 may lead to provision of either an IPv6 address, or an IPv6 range as defined by an IPv6 prefix. At step 335, the IP edge 240 forwards the DHCPv6 solicit message to the DHCP server 250. A response, in the form of a DHCPv6 advertise message comprising the requested IP address prefix, is sent from the DHCP server 250 at step 340. In some embodiments, the IP address prefix is comprised in an IA_PD option of the DHCPv6 advertise message. The IP edge 240 correlates the IP address prefix with the IMSI of the UE 220 by use of the LID and stores a mapping thereof in an internal memory. The IP edge 240 forwards the DHCPv6 advertise message to the RG 210 at step 345. The RG 210 also correlates the IP address prefix with the IMSI of the UE 220 by use of the LID and stores a mapping thereof in its own internal memory. The RG 210 finally assigns the IP address prefix to the UE 220 at step 350, thereby completing the UE 220 registration process.

The UE 220 may become temporarily disconnected from the RG 210, for example during a reboot of either of the RG 210 or UE 220. Upon reconnection of the UE 220, if the IP address prefix is still valid and if the RG 210 has kept the mapping of the IMSI with the IP address prefix, the RG 210 may provide the UE 220 with the present IP address prefix without having to send a new solicit message to the DCHP server 250.

Figure 4:
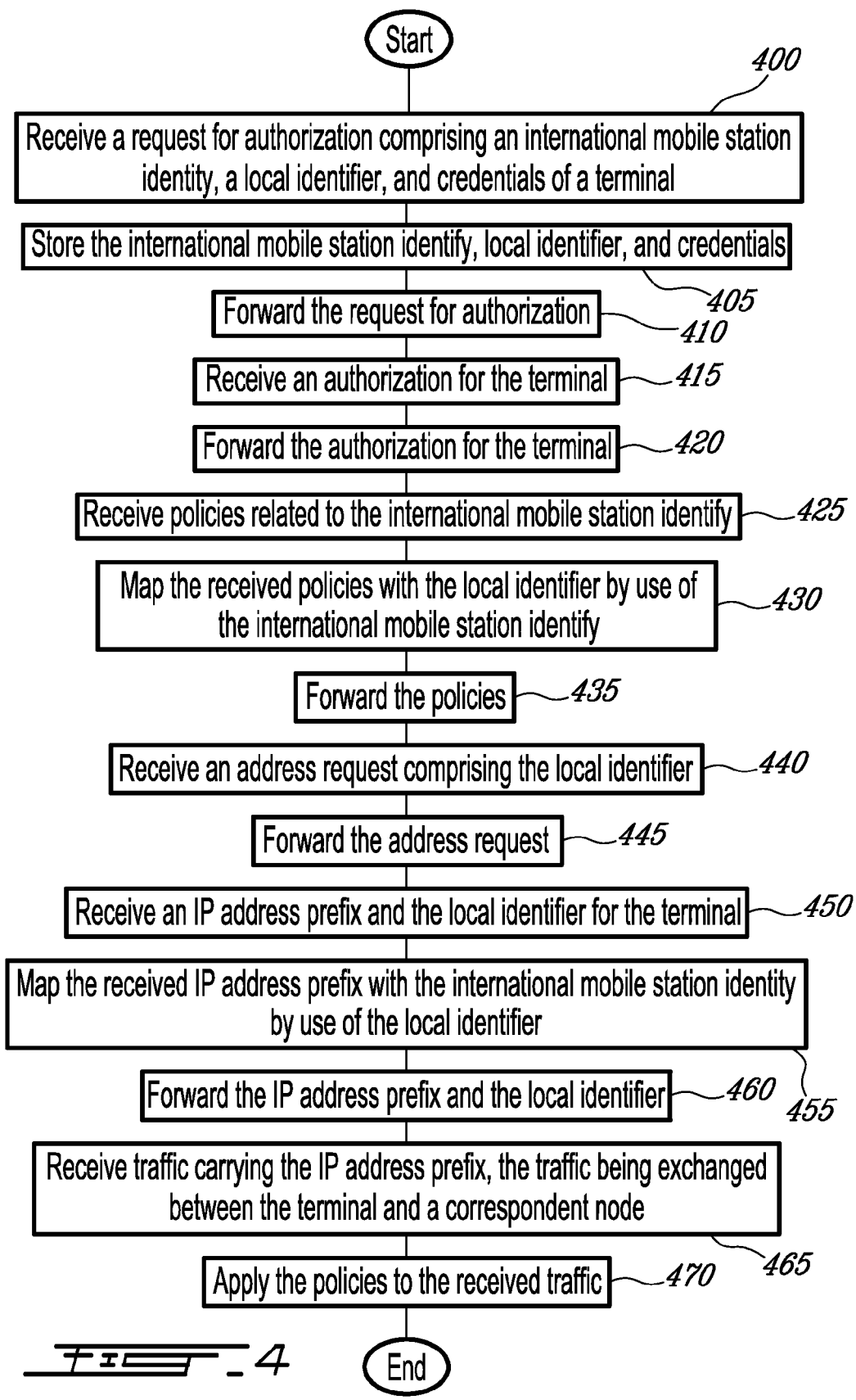
FIG. 4 shows exemplary steps of a method according to some aspects of the present invention.

FIG. 4 shows exemplary steps of a method according to some aspects of the present invention. The sequence starts at step 400 when a request for authorization for a terminal 220, comprising an IMSI and other credentials received from the terminal 220 at a RG 210, is received at an IP edge 240. The RG 210 has assigned a LID to the terminal and added the LID to the information elements received from the terminal 220 prior to forwarding them to the IP edge 240. At step 405, the IP edge 240 stores in an internal memory a mapping of the information elements received in the request for authorization. At step 410, the request for authorization is forwarded by the IP edge 240 to a 3GPP network. An authorization for the terminal is received at the IP edge 240 at step 415 and forwarded to the RG 210 at step 420. At step 425, the IP edge 240 receives policies related to the IMSI. These policies, which may define quality of service parameters and/or resource allocation parameters for the terminal 220, are received from the 3GPP network. At step 430, the IP edge 240 stores the policies in relation with the LID. The IMSI received with the policies is matched with the IMSI that was earlier stored relation with the LID, allowing mapping the policies with the LID. In some embodiments, the IP edge 240 may forward the policies to the RG 210 for storing a local copy of the policies in the RG 210 at step 435. Step 425 may occur at any time following the authorization request of step 410. Steps 425-435 may occur in earlier, in parallel with, or after steps 440-460.

Following the authorization forwarding step 420, the IP edge 240 receives from the RG 210 an address request for the terminal at step 440. The address request comprises the LID. The IP edge 240 forwards the address request, for example to a DHCP server 250, at step 445. An IP address prefix is received along with the LID, at step 450. Then at step 455, the IP address prefix is added to the mapping between the LID and the IMSI, stored in the IP edge 240. The IP address prefix and LID are forwarded to the RG 210 at step 460. At any time thereafter, traffic may be exchanged between the terminal 220 and a correspondent node at step 465. The exchanged traffic, which carries the IP address prefix, passes through the IP edge 240. At step 470, the IP edge 240 applies the policies by ensuring that quality of service levels and/or allocated resources comply with the stored parameters.

Although this is not explicitly shown on FIG. 4, those skilled in the art will realize that the RG 210 may also store a mapping of the IMSI, LID and address prefix for the terminal 220. As a result, the RG 210 may also apply the policies to a traffic passing therethrough.

Figure 5:
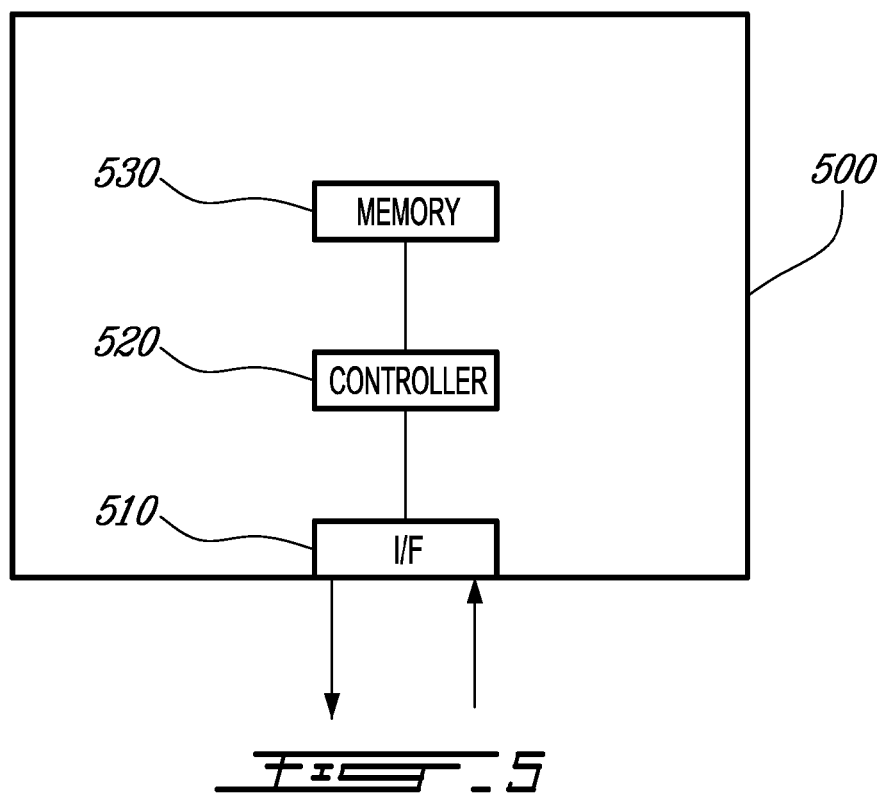
FIG. 5 shows an exemplary edge node according to an aspect of the present invention.

An exemplary construction of an edge node will now be described by reference to FIG. 5, which shows an exemplary edge node according to an aspect of the present invention. The edge node 500 comprises an interface 510, a controller 520 and may comprise a memory 530. The memory 530 may be a volatile memory, or may alternatively be a non-volatile memory, or persistent memory, that can be electrically erased and reprogrammed and that may be implemented, for example, as a flash memory or as a data storage module. The controller 520 may be any commercially available, general purpose processor, or may be specifically designed for operation in the edge node 500. The controller 520 may be operable to execute processes related to the present invention in addition to numerous other processes. The interface 510 may be implemented as one single device or as distinct devices for receiving and sending signaling, messages and data. The edge node 500 is connected towards a plurality of residential gateways; means for connecting the edge node 500 towards residential gateways may vary as, for example, connection towards one residential gateway might be on a coaxial cable while connection towards another residential gateway might be on a digital subscriber line. Likewise, the edge node 500 may connect to AAA servers, HSS nodes, DHCP servers, access nodes, routers, and the like, by use of various transport technologies. Therefore, the interface 510 may comprise a plurality of devices for connecting on a plurality of links of different types. Only one generic interface 510 is illustrated for ease of presentation of the present invention. The edge node 500 may further act as a router and may thus comprise many more components, as is well-known in the art.

The controller 520 controls the interface 510 and may read or write data and information in the memory 530. Any signal, message or data received by the interface 510 is forwarded to the controller 520. Any other signal, message or data prepared or produced by the controller 520 or read by the controller 520 from the memory 530 for purposes of being sent outside of the edge node 500 is forwarded by the controller 520 to the interface 510. The controller 520 is capable of receiving from a residential gateway an identity, credentials and a local identifier of a terminal. In turn, the controller 520 may send the credentials, the identity and the local identifier in a request for authorization for the terminal. The controller 520 may also receive an authorization for the terminal, responsive to which it forwards the authorization to the residential gateway. An address request for the terminal is received by the controller 520, from the residential gateway, and forwarded to an address server. Upon receiving an address for the terminal, such as an IP address prefix, the controller 520 maps the received address prefix with the identity of the terminal by use of the local identifier. The controller 520 also forwards the IP address prefix towards the residential gateway.

Generally, as the controller 520 receives information related to the terminal, it stores that information in the memory 530. For example, the identity, credentials and local identifier of the terminal may be stored in the memory 530, in a manner that ensures that a relation therebetween is preserved. Thereafter, when the address prefix of the terminal is received, a mapping thereof with the local identifier, identity and credentials, may be stored by the controller 520 in the memory 530. The controller 520 may receive policies for handling traffic related to the terminal. The controller 520 stores the policies in the memory 530, also mapped with the address prefix. The controller 520 may further forward the policies towards the residential gateway.

The edge node 500 may receive traffic, in the form of one or more data packets, exchanged between the terminal and a correspondent node. The traffic carries the IP address prefix. Because the memory 530 has stored a mapping of the address prefix of the terminal with the policies, the controller 520 may apply the policies in handling the traffic. Storing of the mapping within the edge node 500 may also be useful when the residential gateway and the edge node 500 have session authentication lifetimes of unequal durations. The edge node 500 may send to the residential gateway, or receive therefrom, mapped information for the terminal. As a result, the edge node 500 and the residential gateway may reuse the mapping information without having to perform a new registration for the terminal.

Figure 6:
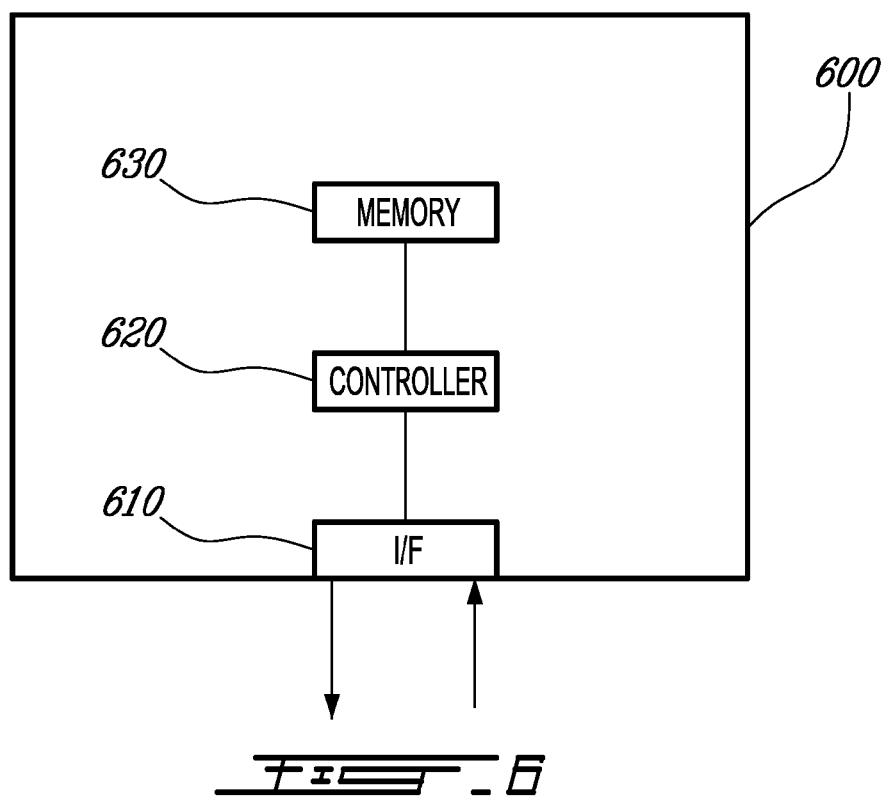
FIG. 6 shows an exemplary residential gateway according to an aspect of the present invention.

An exemplary construction of a residential gateway will now be described by reference to FIG. 6, which shows an exemplary residential gateway according to an aspect of the present invention. The residential gateway 600 comprises an interface 610, a controller 620 and may comprise a memory 630. The memory 630 may be a volatile memory, or may alternatively be a non-volatile memory, or persistent memory. The controller 620 may be any commercially available, general purpose processor, or may be specifically designed for operation in the residential gateway 600. The controller 620 may be operable to execute processes related to the present invention in addition to numerous other processes. The interface 610 may be implemented as one single device or as distinct devices for receiving and sending signaling, messages and data. The residential gateway 600 is connected towards an end-user devices and terminals on one hand, and towards a broadband access network on the other hand; means for connecting the residential gateway 600 to end-user devices and terminals may vary according to the specifics of those terminals and may comprise wired or wireless connections. Connection towards the broadband access network might be on a coaxial cable, on a digital subscriber line, or by use of WiMAX. Therefore, the interface 610 may comprise a plurality of devices for connecting on a plurality of links of different types. The residential gateway 600 may further act as a local router or as a firewall for its connected end-user devices and may thus comprise many more components, as is well known in the art.

The controller 620 controls the interface 610 and may read or write data and information in the memory 630. Any signal, message or data received by the interface 610 is forwarded to the controller 620. Any other signal, message or data prepared or produced by the controller 620 or read by the controller 620 from the memory 630 for purposes of being sent outside of the residential gateway 600 is forwarded by the controller 620 to the interface 610. The controller 620 is capable of receiving an identity and credentials of a terminal. Responsive to receiving the credentials, the controller 620 generates a local identifier dedicated to the terminal. In turn, the controller 620 sends towards an IP edge the credentials, the identity and the local identifier in a request for authorization for the terminal. The controller 620 may also receive from the IP edge an authorization for the terminal, responsive to which the controller 620 may initiate sending an acknowledgement to the terminal. Responsive to receiving the authorization, the controller 620 also sends towards the IP edge an address request for the terminal. Upon receiving an address or a range of addresses for the terminal, such as for example an IP address prefix, the controller 620 forwards the IP address prefix in an IP address assignment message to the terminal. The controller 620 maps the received address with the identity of the terminal by use of the local identifier. The controller 620 may also receive, from the IP edge, policies that guide handling of traffic exchanged between the terminal and a correspondent node.

Generally, as the controller 620 receives or generates information related to the terminal, it may store that information in the memory 630. For example, the identity, credentials and local identifier of the terminal may be stored in the memory 630, in a manner that ensures that a relation therebetween is preserved. Thereafter, when the address of the terminal is received, a mapping thereof with the local identifier, identity and credentials may be stored by the controller 620 in the memory 630. Policies that may be received by the controller 620 are also stored in the memory 630, mapped to the local identifier and to the address of the terminal. As traffic is exchanged between the terminal and the correspondent node, data packets carrying the stored address, the policies may be used to control the traffic. Storing of the mapping within the residential gateway 600 may also be useful when the residential gateway and the IP edge have session authentication lifetimes of unequal durations. The residential gateway 600 may send to the IP edge, or receive therefrom, mapped information for the terminal. As a result, the IP edge and the residential gateway 600 may reuse the mapping information without having to perform a new registration for the terminal.

Although several aspects of the preferred embodiment of the method, and of the NODE of the present invention have been illustrated in the accompanying Drawings and described in the foregoing Detailed Description, it will be understood that the invention is not limited to the embodiments disclosed, but is capable of numerous rearrangements, modifications and substitutions without departing from the teachings of the invention as set forth and defined by the following claims.

The invention claimed is:

1. A method of registering a terminal, the method comprising the steps of:
receiving at an edge node an identity and credentials of the terminal and a local identifier;
sending from the edge node the credentials and the local identifier in a request for authorization for the terminal;
receiving at the edge node an authorization for the terminal;
sending from the edge node an address request comprising the local identifier for the terminal;
receiving at the edge node an address for the terminal; and
storing at the edge node a mapping of the address with the identity of the terminal by use of the local identifier.

2. The method of claim 1, wherein:
the terminal is a dual-mode terminal.

3. The method of claim 2, wherein:
the identity is for use by the dual-mode terminal in a first network; and
the address is for use by the dual-mode terminal in a second network.

4. The method of claim 3, wherein:
the first network is a 3GPP mobile network;
the identity is an international mobile station identity (IMSI);
the second network is an internet network; and
the address is an internet protocol (IP) address prefix.

5. The method of claim 1 further comprising the steps of:
receiving at the edge node policies related to the identity of the terminal; and
adding at the edge node the policies to the mapping.

6. The method of claim 5 further comprising the step of:
applying at the edge node the policies to traffic exchanged through the edge node between the terminal and a correspondent node.

7. The method of claim 5 further comprising the step of:
forwarding from the edge node the policies to a residential gateway.

8. The method of claim 1 wherein:
the local identifier is assigned to the terminal at a residential gateway; and
the identity, the credentials and the local identifier are received at the edge node from the residential gateway.

9. The method of claim 8 wherein:
the step of sending from the edge node the address request is responsive to receiving an address request message from the residential gateway.

10. An edge node for registering a terminal, comprising:
an interface configured to communicate with a residential gateway, an authentication server and an address server; and
a controller to control the interface and configured to:
receive from the residential gateway an identity, credentials and a local identifier of the terminal;
send towards the authentication server the credentials and the local identifier in a request for authorization for the terminal;
receive from the authentication server an authorization for the terminal;
send towards the address server an address request comprising the local identifier for the terminal;
receive from the address server an address prefix for the terminal; and
store a mapping of the received address prefix with the identity of the terminal by use of the local identifier.

11. The edge node of claim 10, wherein:
the controller is further configured to receive policies related to the identity of the terminal and add the policies to the mapping.

12. The edge node of claim 11, wherein:
the controller is further configured to apply the policies to traffic exchanged through the edge node between the terminal and a correspondent node.

13. The edge node of claim 11, wherein:
the controller is further configured to forward the policies towards the residential gateway.

14. A residential gateway for registering a terminal, comprising:

an interface configured to communicate with the terminal and with an edge node; and a controller to control the interface and configured to:
- receive from the terminal an identity and credentials of the terminal;
- assign a local identifier to the terminal;
- send towards the edge node the identity, the credentials and the local identifier in a request for authorization for the terminal;
- receive from the edge node an authorization for the terminal;
- send towards the edge node an address request comprising the local identifier for the terminal;
- receive from the edge node an address for the terminal; and
- store a mapping of the received address with the identity of the terminal by use of the local identifier.

15. The residential gateway of claim 14, wherein:
the controller is further configured to receive from the edge node policies related to the identity of the terminal and add the policies to the mapping.

16. The residential gateway of claim 15, wherein:
the controller is further configured to apply the policies to traffic exchanged through the residential gateway between the terminal and a correspondent node.

* * * * *

UNITED STATES PATENT AND TRADEMARK OFFICE
CERTIFICATE OF CORRECTION

PATENT NO. : 8,189,567 B2
APPLICATION NO. : 12/482981
DATED : May 29, 2012
INVENTOR(S) : Kavanagh et al.

It is certified that error appears in the above-identified patent and that said Letters Patent is hereby corrected as shown below:

In Fig. 4, Sheet 4 of 5, for Tag "405", in Line 1, delete "identify," and insert -- identity, --, therefor.

In Fig. 4, Sheet 4 of 5, for Tag "425", in Line 1, delete "identify" and insert -- identity --, therefor.

In Fig. 4, Sheet 4 of 5, for Tag "430", in Line 2, delete "identify" and insert -- identity --, therefor.

In Column 5, Line 41, delete "MA" and insert -- AAA --, therefor.

In Column 6, Line 45, delete "DCHP" and insert -- DHCP --, therefor.

Signed and Sealed this
Nineteenth Day of February, 2013

Teresa Stanek Rea
*Acting Director of the United States Patent and Trademark Office*